United States Patent
McCulty

[11] 3,734,148
[45] May 22, 1973

[54] GRINDER

[76] Inventor: Wayne A. McCulty, 918 East Franklin Street, Troy, Ohio 45373

[22] Filed: Oct. 15, 1971

[21] Appl. No.: 189,524

[52] U.S. Cl. ............................... 241/82.1, 241/247
[51] Int. Cl. .............................................. B02c 18/30
[58] Field of Search ............................... 146/182–190

[56] References Cited

UNITED STATES PATENTS

| 625,400 | 5/1899 | Lambert | 146/190 |
|---|---|---|---|
| 1,021,000 | 3/1912 | Mitchell | 146/189 R |
| 2,268,753 | 1/1942 | Kerr | 146/189 R X |
| 2,583,600 | 1/1952 | Schreiber | 146/189 R X |
| 3,323,570 | 6/1967 | Tullock et al. | 146/186 |

*Primary Examiner*—Willie G. Abercrombie
*Attorney*—Jerome R. Cox

[57] ABSTRACT

A grinder having a pair of interconnected separated feed casings. One of the pair of casings (i.e. the inlet casing) is substantially cylindrical and is connected to the inlet hopper. The other casing (i.e. the outlet casing) tapers externally and in one sense internally from a relatively large diameter at the inlet end to a relatively small diameter at the outlet end. Each of the casings is fitted with an axial worm for advancing material such as for example meat supplied to the inlet casing through the inlet hopper and for moving it towards the outer end of the inlet and towards and into and through the outlet casing. The outlet casing is provided with an axial worm which moves the material through that casing to a cutting knife which is associated with a cutting die at the outer end of the outlet casing. There are means for simultaneously driving both of the worms as well as the cutting knife. The worms are both formed with a non-circular longitudinal opening such as a square opening or hexagonal opening or a half-round opening. A non-cylindrical shaft fits in the openings and extends through both worms for driving the worms. The cutting knife is also driven from the outlet casing worm. The two casings may be pivotally connected together or may be threadedly connected. The outlet casing is provided with at least one continuous internal spiral of which the flutes are progressively shallower from the inlet end to the outlet end (three spirals are shown). The worm in the outlet casing has flutes which decrease in depth progressively from the inlet end to the outlet end. However, the flutes in the worm can, if desired, be constant. An automatic shut-off of power may be provided which shuts off the motor whenever there is a no-load condition.

16 Claims, 11 Drawing Figures

INVENTOR
Wayne A. McGulty
BY
Jerome R. Cox
Attorney

INVENTOR
Wayne A. McCulty
BY
Jerome R. Cox
Attorney

PATENTED MAY 22 1973
3,734,148
SHEET 3 OF 3
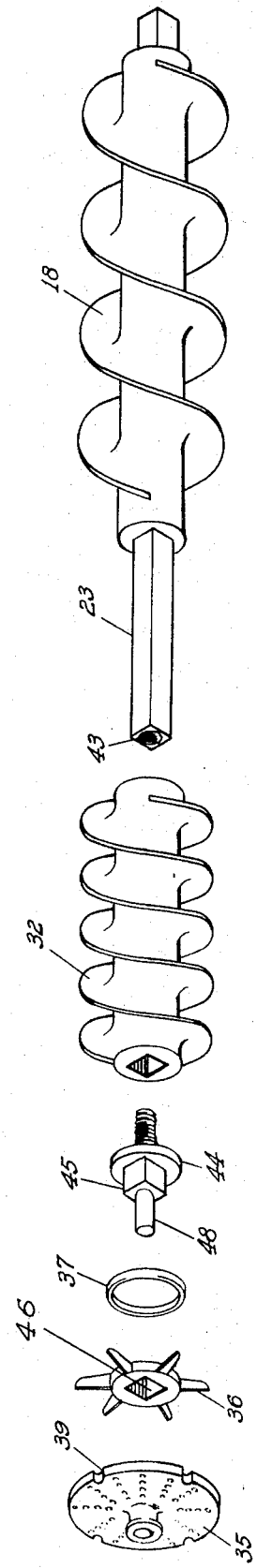
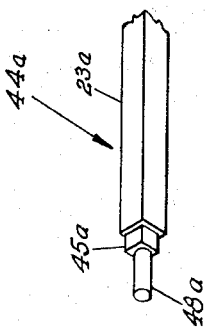
INVENTOR
Wayne A. McCulty
BY Jerome R. Box
Attorney 3,734,148

GRINDER

BACKGROUND OF THE INVENTION

Many grinders of various constructions have heretofore been designed and constructed. Of the important features of such grinders, one is that they shall operate efficiently and a second is that the material may be kept safe from contamination. Grinders with tapered casings and tapered worms are broadly old. However, it appears that most of the grinders shown in the prior art patents taper, if they taper at all, in a direction with the widest end at the outlet and the narrow and end at the inlet. Also, the feature of rifling in cylinders is shown in several patents. It does not appear that any of the prior art patents show rifling with grooves progressively deeper from one end to the other, nor rifling in which the pitch decreases from the inlet end to the outlet end thereof.

This invention relates in general to grinders by which material is fed in chunks into the grinder and is comminuted to small granules for various purposes. In general, the invention is directed to the securing of cleanliness which is essential in apparatus of this type. My device is also designed to move the material forward quickly and to move the material under high pressure into the cutting knife. In the prior art, there have been proposed rifling in the casing. However, in my design the casing grooves are deeper and/or wider at the inlet end than at the outlet end thus drawing in an appreciably greater amount of product for a given worm turn and thereby delivering the product at greater pressure as it approaches the knife in order to secure greater efficiency in the operation of cutting the material into small granules. The worms in my device are constructed so that they are easily removable. They are formed with a non-circular opening extending longitudinally through them, and are provided with a non-circular driveshaft extending through the opening to drive the feeding worms or screws. The device also provides a plurality of separable casings in each of which there is provided a feeding worm, the worms not being integral nor of themselves connected but are all driven by the non-circular driveshaft.

SUMMARY OF THE INVENTION

The invention relates to a grinder consisting of two separable casings connected to each other. Each casing is provided with a feed worm or screw. These worms are of different pitches, the one from the other. The inlet casing has a worm with a wider pitch to create a quick movement of the materials which are fed into the casing. The outlet casing has a worm with a narrower pitch to create greater pressure in forcing material into and past the knife, thus providing greater efficiency in the cutting of the material into small granules. Both worms are mounted on and driven by a non-circular (squared, as shown) shaft extending through longitudinally extending non-circular holes formed in the worms. Both the outlet casing and the outlet worm therein have flutes decreasing in depth and/or pitch from the inlet end of the outlet casing to the outlet end thereof to increase the pressure. The knife is also driven by the non-circular shaft either driven indirectly as shown, or if desired, driven directly by the shaft.

One of the objects of my invention is the achievement of greater cleanliness in operating a material grinder.

A further object of the invention is an increase of efficiency in a grinder by providing high pressure for forcing the material into and through the cutting knives.

A further object of the invention is the provision of separable casings.

A further object of the invention is the provision of removable feeding worms so that the whole device may be easily disassembled and easily cleaned by one man.

A further object of the invention is the provision of flutes in the outlet casing which decrease in depth and/or in pitch as they approach the cutting knife.

A further object of the invention is the provision of flutes in the feeding worm of the casing which may remain constant in depth and pitch as they approach the cutting knife.

A further object of the invention is the provision of a plurality of worms each having a different pitch but located in different casings and connected to each other so that they are both driven at a uniform speed.

A further object of the invention is the provision of a new type of spring for exerting pressure on the knife as it rotates in substantial contact with the cutting die, thus contributing to more efficient cutting action and long knife and die life.

Further objects of the invention will be apparent from the following specification and claims and from the drawings.

DESCRIPTION OF THE DRAWINGS

FIG. 5 is a view in perspective of the cutting die;

FIG. 6 is a view in perspective of the cutting knife;

FIG. 7 is a view in perspective of a specially designed spring which may be similar to a section of a bellows and by which the knife is held against the cutting die;

FIG. 8 is a view in perspective of a threaded drive stud which provides a drive for the knife;

FIG. 9 is a view in perspective of the high pressure worm which is located in the outlet casing;

FIG. 10 is a perspective view of the fast feeding worm provided in the inlet casing and showing it mounted on the squared shaft by which it is driven; and FIG. 11 is a fragmentary view in perspective of a modified driveshaft with which a drive stud is integral.

Figure 1:
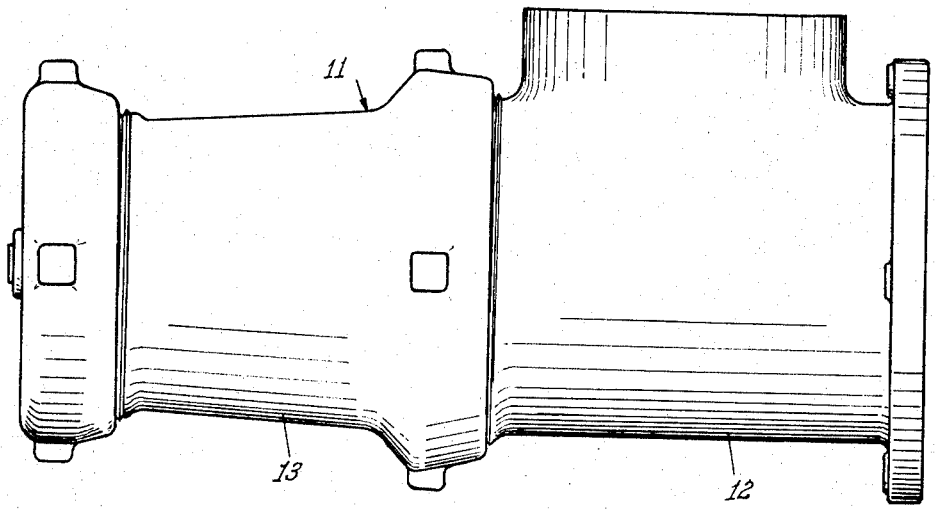
FIG. 1 is a view in front elevation of a grinder embodying the invention.

In describing the preferred embodiments of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

For example, the term "squared shaft" is intended to include all non-circular shafts which may cooperate with the non-circular longitudinal holes in the worms. The term "screw" is not restricted to a screw per se, but refers to any form of feeding worm.

For example also, the grinder is shown and described as a meat grinder but it is to be understood that the grinder may be for any other kind of food, or actually for any other kind of material.

DETAILED DESCRIPTION

Figure 2:
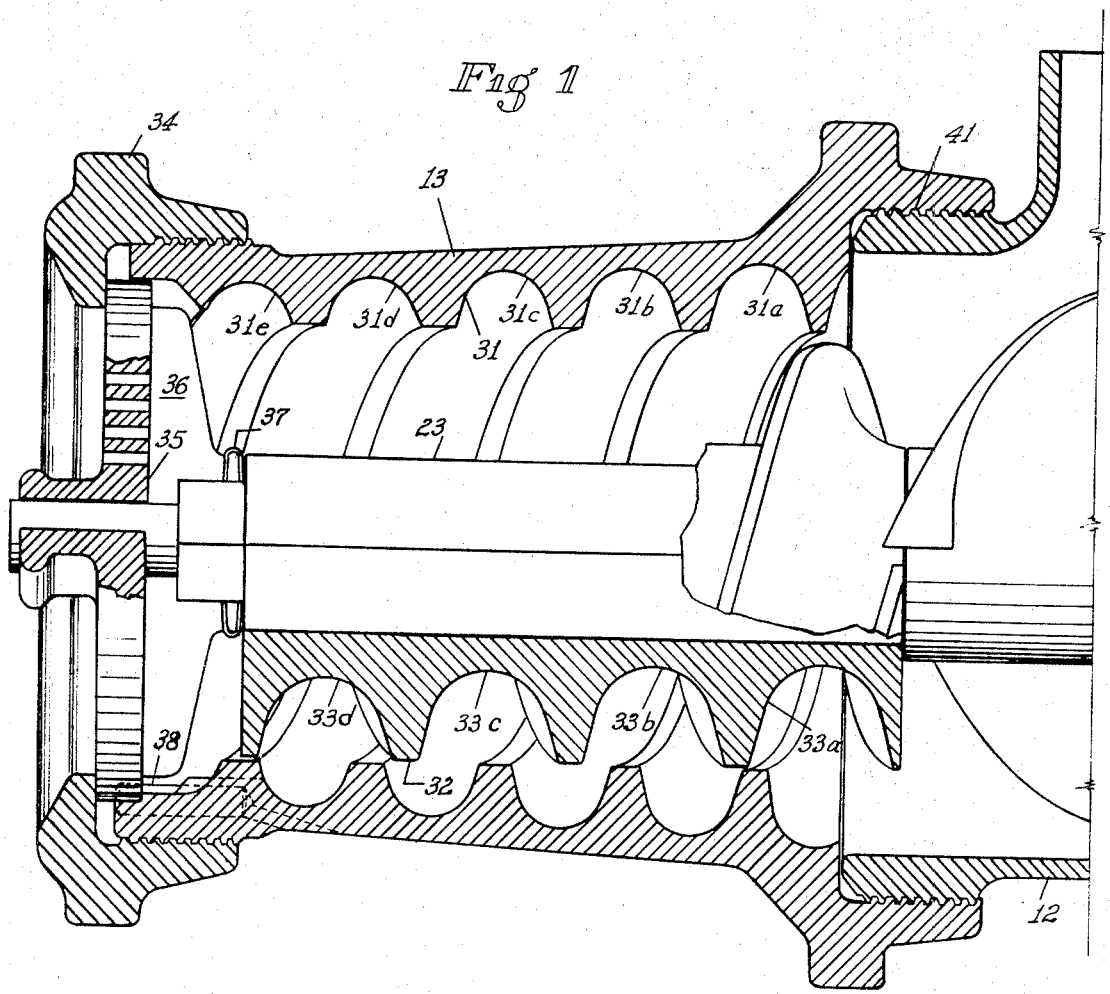
FIG. 2 is a view in vertical section of the outlet casing of the grinder shown in FIG. 1 (i.e. the left hand end of the grinder shown in FIG. 1) and a small adjacent portion of the associated inlet casing.
Figure 3:
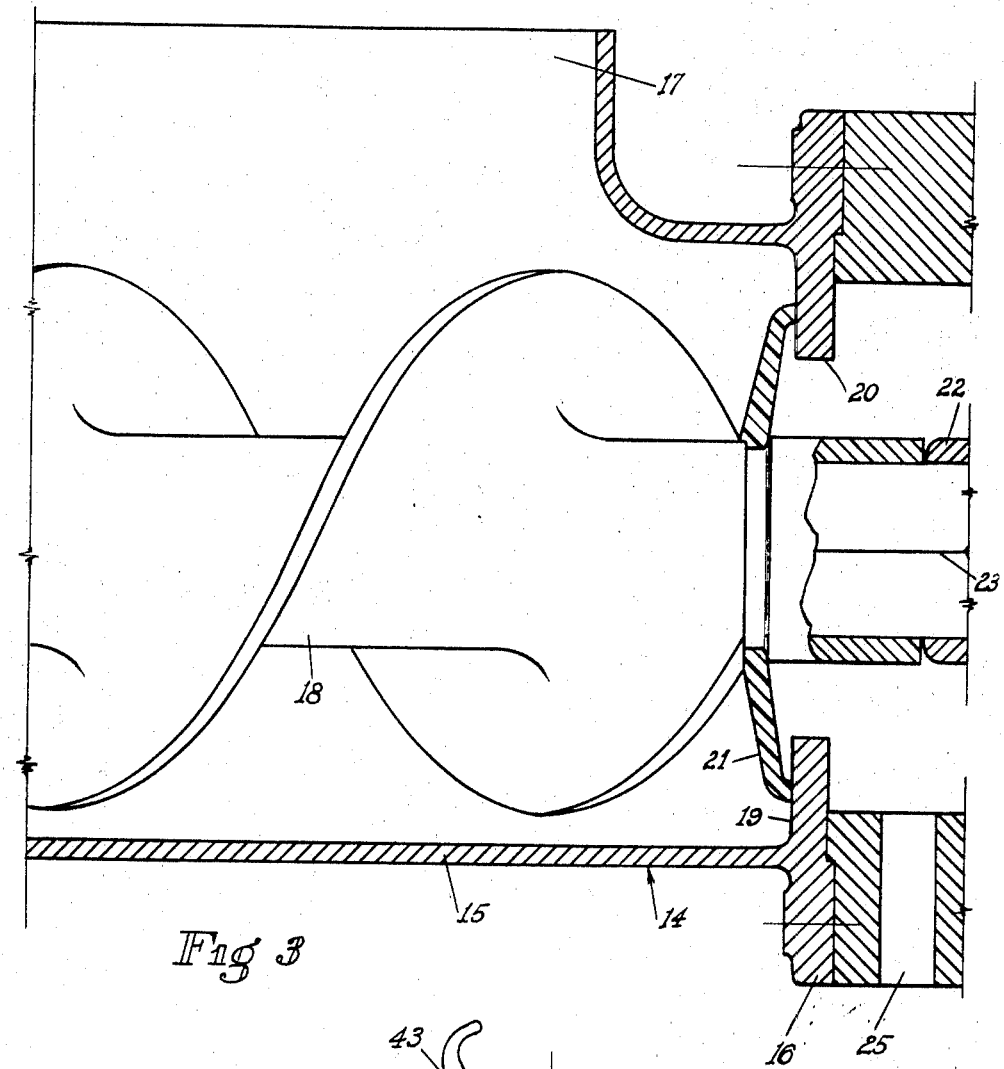
FIG. 3 is a view in vertical section of a portion of the inlet casing of the grinder (i.e. the end shown in the right hand portion of FIG. 1)

FIGS. 1, 2 and 3 illustrate a meat grinder 11 constructed according to my invention. The meat grinder 11 is formed of an inlet casing 12 and an outlet casing 13.

In FIG. 3, there is shown a casting 14 which forms the inlet casing 12. The casting 14 includes the sidewall 15 and the end plate 16. At the upper end of the casting 14 there is formed an opening 17 through which meat is fed into the casing 12. The opening 17 forms the inlet hopper for the casing 12. Within the casing 12 there is inserted a worm 18 having relatively wide flutes by which meat is fed from the inlet hopper opening 17 and is moved from the right hand portion of the casing 12 to the left hand portion of the casing 12 as shown in FIG. 3; that is, from the inlet end toward the outlet end and towards the feeding casing 13. The end plate 16 is provided with an opening 20 which is covered by a flexible excluder type seal 21. The seal 21 snaps into a groove in a round rearward extension of worm 18 which extends in turn through the opening 20. The outer edges of the seal 21 bear on the inner face 19 of the plate 16. A drive coupling 22 has a non-circular opening into which the squared drive shaft 23 is inserted.

The opening 25 allows flushing and draining through opening 20 between an outboard bearing supporting the drive coupling 22 and the end plate 16.

The above construction is to provide more complete disassembly and easier and more efficient and thorough cleaning of what has heretofore been an unsatisfactory area from a sanitary viewpoint. The drive coupling 22 is driven by a motor (not shown) and by reason of the connection with the squared shaft 23 drives the worm 18, it being understood that the worm 18 has longitudinally thereof a non-circular opening through which the squared shaft 23 extends.

The casing 13 and its connection with the casing 12 is shown more in detail in FIG. 2. The casing 13 is exteriorly tapered from the inlet end of the casing (the right hand end as shown in FIG. 2) towards the outlet end (the left hand end of FIG. 2). The casing 13 is formed with interior rifling 31. As may be seen from the drawings, the flutes of the rifling 31 are deeper at the right hand or inlet end of the casing 13 as at 31a and gradually become less deep as they progress through the portions of the flute designated as 31b, 31c, 31d and 31e. In an alternative arrangement, the pitch of the rifling decreases as it approaches the outlet so as to increase the pressure on the meat being extruded. The exterior casing 13 itself tapers from a relatively large diameter at the inlet end (right hand end of FIG. 2) towards the outlet end (the left hand end of FIG. 2). Within the casing 13 there is provided a feed worm 32 which has flutes which also (as may be seen at the lower part of the figure) progressively decrease in depth from the inlet end (as at 33a) and as shown at 33b and 33c to the outlet end (as at 33d). In an alternative arrangement, the worm decreases in pitch as it approaches the outlet in order to increase the pressure on the meat. The worm 32 is also formed with a squared longitudinal opening through which the squared shaft 23 extends.

It will be noted that while the exterior of the casing 13 tapers from the inlet end to a smaller diameter at the outlet end, and while the flutes in the worm and in the interior of the casing are deeper at the inlet end than at the outlet end, the interior diameter of the casing 13 and the exterior diameter of the worm 32 are uniform from the inlet end toward the outlet end.

In the structure as shown, the worm 32 is formed with two flights substantially parallel to each other and the groove 31 in the casing is formed with three flights substantially parallel to each other but in each there can be more or less flights. Therefore, in the claims where the worm is defined as having a flight or flute, there may be one or more such flights or flutes.

It should also be noted that the feed worm 32 could readily be installed in a reverse manner so that the depth of flutes are shallower at the inlet end and deeper at the outlet end, thus partially negating the effect of the casing flutes 31. This effect would be desirable for certain applications. It should also be noted that an optional feed worm 32 with full and constant depth and pitch flutes 33 could readily be substituted, thus providing a very high rate of product movement through at a reduced pressure requirement.

Adjacent the outlet end of the casing 13 there is provided an end ring 34 which secures the plate or cutting die 35 to the meat grinder. Inwardly from the cutting die is the knife 36 on which the spring 37 bears to hold the knife in contact with the plate 35. The spring is in the nature of a specially designed spring which may be similar to a section of a bellows and which operates efficiently to hold the knife at the proper tension against the die. The die is prevented from turning by pins or keys such as 38 which fit into keyways or notches such as 39 in the plate as shown in FIG. 5.

The casing 12 is secured to the casing 13 by screw threads such as threads 41 shown in FIG. 2.

Figure 4:
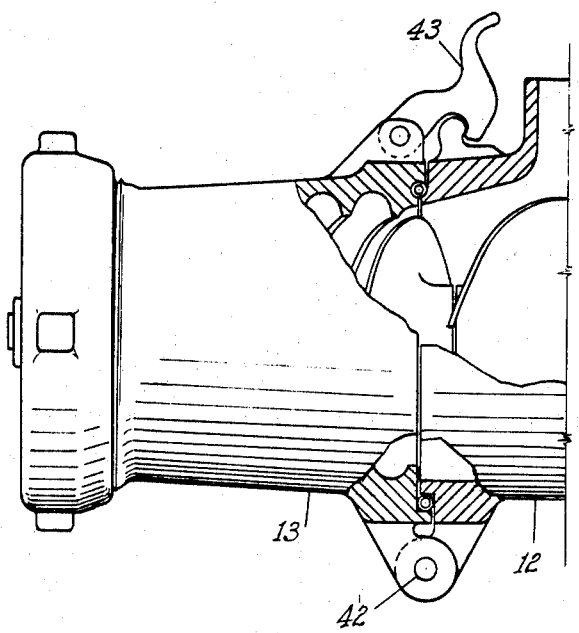
FIG. 4 is a view in elevation of the outlet end of a grinder similar to the grinder shown in FIG. 1 and a portion of the inlet end thereof but showing a modified form of connection between the two casings, the view being on a smaller scale and having portions broken away and portions in section.

Alternatively, the casing 13 may be secured to the casing 12 as shown in FIG. 4 wherein there is shown a hinge 42 and a latch 43 for securing the parts to each other and for quick separation of the parts so as to remove the worms and cylinders or casings for cleaning.

The individual parts of the worm, spring, knife and die are shown in greater detail in FIGS. 5, 6, 7, 8, 9, and 10. Therein it may be seen that the fast feeding worm section 18 fits over the squared shaft 23, but it is to be understood that the worm 18 may be easily removed from the shaft 23 and that the shaft 23 is shown already removed from the high pressure worm section 32 shown in FIG. 9. The end of the squared shaft 23 is provided with a threaded opening 43 into which the drive stud 44 is screwed so that the drive stud 44 is driven by the squared shaft 23. The drive stud 44 extends through the spring 37 and has a squared section 45 which extends through a squared hole 46 of the knife 36. The plate 35 is formed with a small round hole into which the round small shaft 48 of the drive stud 44 extends and in which the shaft 48 revolves. The plate 35 is prevented from turning by keys such as the key 38 which cooperate with the notches 39.

To better satisfy the very strict sanitary requirements of the laws and regulations regarding meat and other food grinding machines, my construction involving the separate squared drive shaft 23 driving the worms 18 and 32, and the knife 36 through the drive stud 44, enables the parts to be easily disassembled and cleaned and thus leads to more frequent and better cleaning.

I further provide in the alternative structure illustrated in FIG. 11 an arrangement which even further insures satisfaction of sanitary requirements. As illustrated therein, the drive stud 44a (having a squared section 45a and a round shaft 48a) is made integral with the drive shaft 23a and is machined on the end of said drive shaft 23a. Thus the drive shaft 23a and the stud 44a become one integral part and the joint or crack between two parts as at the opening 43 is eliminated to give even greater sanitary protection.

It is to be understood that while the detailed drawings and specific embodiments given describe preferred embodiments of the invention, they are for the purpose of illustration only; that the apparatus of the invention is not limited to the precise details and conditions disclosed; and that various changes may be made therein without departing from the spirit of the invention which is defined by the following claims.

I claim:

1. An improved grinder which comprises in combination:
   a casing formed with at least one continuous internal spiral groove extending from the inlet end of the casing to the outlet end thereof, said continuous internal spiral groove in the inner surface of the casing exerting increasing pressure on the material being ground as it progresses from the inlet end of the casing to the outlet end thereof;
   an inlet hopper connected to said casing for supplying material thereto, an axial worm in said casing for advancing material supplied to said casing towards its outer end;
   a cutting die secured at the outer end of said casing;
   a cutting knife associated with and bearing on said cutting die; and
   means for simultaneously and concurrently driving the axial worm in the casing and the cutting knife.

2. A structure according to claim 1, wherein a continuous internal spiral groove in the inner surface of the casing has a flute which is progressively shallower from the inlet end of the casing to the outlet end thereof.

3. A structure according to claim 1, wherein a continuous internal spiral groove in the inner surface of the casing has a progressively decreasing pitch from the inlet end of the casing to the outlet end thereof.

4. An improved grinder which comprises in combination:
   a casing;
   an inlet hopper connected to said casing for supplying material thereto;
   an axial worm in said inlet casing for advancing material supplied to said casing toward its outer end formed with a substantially central non-circular longitudinal opening extending from the inlet end of the worm to the outer end thereof;
   a cutting die secured to the outer end of said casing;
   a cutting knife associated with and bearing on said cutting die; and
   means comprising a non-circular shaft extending through said non-circular longitudinal opening and connected to said cutting knife for simultaneously and concurrently driving the axial worm and the cutting knife.

5. The structure of claim 4 in which said casing is an outlet casing, and there is also provided,
   an inlet casing to which the inlet hopper is directly connected;
   worms in both of said casings, each having a non-circular opening, and
   the non-circular shaft extends through the non-circular opening of both of the worms.

6. An improved grinder which comprises in combination:
   a pair of interconnected feed casings one being an inlet casing and the other being an outlet casing;
   an inlet hopper positioned above and connected to said inlet casing for supplying meat thereto;
   an axial worm in said inlet casing for advancing meat supplied to said inlet casing hopper towards its outer end and towards and into said outlet casing;
   the outlet casing tapering from a relatively large diameter connected to and registering with the adjacent end of the inlet casing to a relatively small diameter at its outer end and being formed with a continuous internal spiral groove extending from the inlet end of the casing to the outlet end thereof;
   an axial worm in said outlet casing, tapering from a relatively large flute depth and/or pitch at the inlet end of said outlet casing to a relatively small flute depth and/or pitch at the outer end of said casing;
   a cutting die secured at the outer end of said outlet casing;
   a cutting knife associated with and bearing on said cutting die; and
   means for simultaneously and concurrently driving the axial worm in the inlet casing, the axial worm in the outlet casing and the cutting knife.

7. The structure of claim 6 in which the flutes of the continuous internal spiral groove in the inner surface of the outlet casing are progressively shallower from the inlet end of the outlet casing to the outer end thereof.

8. The structure of claim 6 in which both of the worms are formed with non-circular openings extending from the inlet end to the outer ends thereof and a non-cylindrical shaft extends through both worms for driving said worms.

9. The structure of claim 8, in which the cutting knife is driven by the non-cylindrical drive shaft.

10. The structure of claim 6, in which the outlet casing is pivotally secured to the inlet casing.

11. The structure of claim 10, in which a locking catch is provided opposite to the point at which the outlet casing is pivoted to the inlet casing.

12. The structure of claim 6, in which the outlet casing is threaded onto the inlet casing.

13. The structure of claim 6, in which the worm in the outlet casing has a pitch which decreases progressively from the inlet end to the outer end.

14. The structure of claim 6, in which there is provided an automatic shut off of power dependent on a no-load condition.

15. The structure of claim 14, in which the automatic shut off is controlled by the decrease in current required to run the motor in a no-load condition.

16. The structure of claim 6, in which the inlet casing is provided with an axial opening rearward of the inlet hopper and the opening is provided with an easily removable, flexible, excluder type seal.

* * * * *